US012759856B2

(12) United States Patent
Clausen et al.

(10) Patent No.: US 12,759,856 B2
(45) Date of Patent: Oct. 13, 2026

(54) METHOD FOR CONTROLLING A BUFFER CONVEYOR OF A THERMAL CONTAINER TREATMENT DEVICE, AND FILLING LINE

(71) Applicant: Krones AG, Neutraubling (DE)

(72) Inventors: Niels Clausen, Dollerup (DE); Christian Depner, Silberstedt (DE); Jens Luecke, Flensburg (DE)

(73) Assignee: Krones AG, Neutraubling (DE)

( * ) Notice: Subject to any disclaimer, the term of this patent is extended or adjusted under 35 U.S.C. 154(b) by 147 days.

(21) Appl. No.: 18/711,855

(22) PCT Filed: Nov. 21, 2022

(86) PCT No.: PCT/EP2022/082604
§ 371 (c)(1),
(2) Date: May 20, 2024

(87) PCT Pub. No.: WO2023/089172
PCT Pub. Date: May 25, 2023

(65) Prior Publication Data
US 2025/0026624 A1 Jan. 23, 2025

(30) Foreign Application Priority Data
Nov. 22, 2021 (DE) ..................... 10 2021 130 464.4

(51) Int. Cl.
*B67C 3/24* (2006.01)
*B67C 3/00* (2006.01)
(Continued)

(52) U.S. Cl.
CPC ................ *B67C 3/007* (2013.01); *B67C 3/24* (2013.01); *B67C 7/002* (2013.01); *B65G 43/00* (2013.01)

(58) Field of Classification Search
CPC ........... B67C 3/007; B67C 3/24; B67C 3/002; B65G 43/00
See application file for complete search history.

(56) References Cited

U.S. PATENT DOCUMENTS 3,998,319 A * 12/1976 Mernoe ................ B65G 47/682 198/572
4,848,381 A * 7/1989 Livingston ............... B67D 1/07 141/90

(Continued)

FOREIGN PATENT DOCUMENTS

DE 4314662 A1 11/1994
DE 4434176 A1 3/1996

(Continued)

OTHER PUBLICATIONS

Voigt, "New Methods for the Use of Information Technology in Beverage Bottling Plants," retrieved from the Internet: https://mediatum.ub.tum.de/doc/603519/603519.pdf, Technical University of Dresden, Jul. 8, 2004, 380 pages.

(Continued)

*Primary Examiner* — Nicolas A Arnett

(57) ABSTRACT

The invention relates to a method for controlling a buffer conveyor for buffering containers, which buffer conveyor is comprised by a thermal container treatment device in a filling line as a buffer device. The filling line comprises at least one further device for treating the containers, said device being upstream or downstream of the thermal container treatment device. The method comprises: capturing error data relating to the at least one further device; analyzing the error data and obtaining control data; and controlling a fill level of the buffer conveyor during normal operation of the filling line on the basis of the control data. The invention also relates to a filling line comprising a thermal container treatment device, which comprises a buffer conveyor for (Continued)

buffering containers, wherein: the buffer conveyor is comprised in the filling line as a buffer device; the filling line also comprises at least one further device for treating the containers, which further device is upstream or downstream of the thermal container treatment device; wherein the buffer conveyor is controlled by means of the method according to the invention.

20 Claims, 11 Drawing Sheets

(51) Int. Cl.
*B67C 7/00* (2006.01)
*B65G 43/00* (2006.01)

(56) References Cited

U.S. PATENT DOCUMENTS

| | | | | | |
|---|---|---|---|---|---|
| 8,505,268 | B2 * | 8/2013 | Stoiber | B29C 49/78 53/55 |
| 9,434,591 | B2 * | 9/2016 | Till | B67C 3/007 |
| 9,546,011 | B2 * | 1/2017 | Stoiber | B29C 49/78 |
| 10,125,001 | B2 * | 11/2018 | Führer | B67C 3/007 |
| 10,167,143 | B2 * | 1/2019 | Senn | B65G 37/02 |
| 10,315,864 | B2 * | 6/2019 | Tanaka | B65G 57/245 |
| 2001/0045242 | A1 * | 11/2001 | Clusserath | B67C 3/007 141/144 |
| 2014/0298100 | A1 * | 10/2014 | Grimm | B65C 9/40 714/37 |
| 2016/0041086 | A1 * | 2/2016 | Jacques | G01N 19/02 73/9 |
| 2016/0052764 | A1 * | 2/2016 | Führer | B67C 3/007 348/143 |
| 2022/0106178 | A1 * | 4/2022 | Mauboussin | B65G 47/842 |

FOREIGN PATENT DOCUMENTS

| | | | | | |
|---|---|---|---|---|---|
| DE | 102011017448 | A1 | | 10/2012 | |
| DE | 102013207139 | A1 | | 10/2014 | |
| EP | 3778439 | B1 | * | 8/2023 | B29C 49/42101 |
| WO | WO-2020136363 | A1 | * | 7/2020 | B29C 49/42069 |
| WO | WO-2023089170 | A1 | * | 5/2023 | A23B 2/001 |

OTHER PUBLICATIONS

International Search Report and the Written Opinion of the International Searching Authority dated Mar. 14, 2023, in connection with International Application No. PCT/EP2022/082604, 11 pages.

Search Report dated Oct. 27, 2023, in connection with German Application No. 10 2021 130 464.4, 12 pages.

* cited by examiner

METHOD FOR CONTROLLING A BUFFER CONVEYOR OF A THERMAL CONTAINER TREATMENT DEVICE, AND FILLING LINE

CROSS-REFERENCE TO RELATED APPLICATIONS

This application is a 371 National Stage of International Application No. PCT/EP2022/082604, filed Nov. 21, 2022, which claims priority to German Patent Application No. 10 2021 130 464.4, filed Nov. 22, 2021, the disclosures of which are incorporated herein by reference.

TECHNICAL FIELD

The present invention relates to a method for controlling a buffer conveyor of a thermal container treatment device and a filling line.

BACKGROUND

It is known from the field of filling technology that products filled into containers in a system with a filler must be pasteurized, for example in a pasteurizer. Other processes, such as inspecting the containers in an inspection machine and drying the containers in a dry section, can follow the pasteurization process. In order to be able to take account of any errors that may occur in these machines-filler, pasteurizer, inspection machine, dry section-a buffer can be provided between the filler and the pasteurizer, between the pasteurizer and inspection machine and between the inspection machine and the dry section. The buffers can each be designed to buffer the containers for a period of up to 60 seconds. Using these multiple buffers, possible errors in the individual machines can be rectified without having to stop the entire production line.

The nominal line output in such a system can correspond to the nominal output of the pasteurizer. The filler upstream of the pasteurizer can be oversized by 10% to 20%, for example, in order to be able to refill the buffer between the filler and the pasteurizer after an error in the filler. The machines downstream of the pasteurizer can be oversized by 20%, for example, in order to be able to maintain high line efficiency and to be able to reduce the number of containers accumulated on the respective buffer after an error, for example.

A large amount of space is required to move the buffers in mass transport. In addition, the buffer between the filler and the pasteurizer, for example, is only used to buffer containers in the event of errors in the filler. It is not intended to use the buffer between the filler and the pasteurizer for buffering in the event of errors in the pasteurizer and/or the inspection machine and/or the dry section.

DE 44 34 176 A1 discloses a method for an output-based supply of machines in container treatment systems, so that otherwise unavoidable machine stops within such a container treatment system can be avoided or reduced. The method provides that, depending on the throughput rate or the degree of filling of the conveyors and/or machines upstream and downstream of the cleaning machine, the filling state of the cleaning machine can be adjusted by changing the number of containers to be cleaned. If there is a container shortage in the system, the downstream machines can continue to operate without any problems as a result of the reserve in the cleaning machine, without having to stop prematurely.

Based on the known prior art, the technical object to be achieved is to provide a method for controlling a buffer conveyor of a thermal container treatment device and a filling line with such a thermal container treatment device, with which a flexible operation of the buffer conveyor and reduced space requirements of the filling line can be achieved.

SUMMARY

This object is achieved according to the invention by the method and the filling line. Further embodiments and developments are covered.

The method according to the invention for controlling a buffer conveyor for buffering containers, which buffer conveyor is comprised by a thermal container treatment device in a filling line as a buffer device, the filling line comprising at least one further device for treating the containers, said device being upstream or downstream of the thermal container treatment device, comprises: capturing error data relating to the at least one further device; analyzing the error data and obtaining control data; and controlling a fill level of the buffer conveyor during normal operation of the filling line on the basis of the control data.

The error data and/or control data relating to the at least one further device are captured in order to be able to flexibly take account of any errors that may occur in the at least one further device by buffering containers on the buffer conveyor. By analyzing the error data, control data are obtained which are then used for controlling the fill level of the buffer conveyor during normal operation. During an error, the fill level of the buffer conveyor may deviate from the fill level during normal operation.

In the event of an error in a device upstream of the thermal container treatment machine, the buffer conveyor can gradually run empty during the error. In the event of an error in a device downstream of the thermal container treatment machine, the buffer conveyor can gradually fill up during the error.

Therefore, by controlling the fill level of the buffer conveyor during normal operation, the available buffer time can be adjusted in the event of errors. For example, if it is considered that more errors occur upstream of the thermal container treatment device, a higher fill level of the buffer conveyor during normal operation can ensure a longer buffer time than a lower fill level. For example, if it is considered that more errors occur downstream of the thermal container treatment device, a lower fill level of the buffer conveyor during normal operation can ensure a longer buffer time than a higher fill level.

A further device that can be upstream of the thermal container treatment machine, i.e. the buffer conveyor, can be a filler. The filler can also comprise an inspection, rejection and/or turning device in addition to the filler. A capper can also be provided. In the case of glass containers, a washing device can be provided and in the case of PET containers, a neck sterilizer can be provided.

A further device that can be arranged downstream of the buffer conveyor can be an inspection machine or a dry section. Both an inspection machine and a dry section can also be provided.

The buffer conveyor for buffering containers can be comprised by the thermal container treatment device in the filling line as the only buffering device.

The thermal container treatment device, such as a pasteurizer, a cooler or a warmer, may comprise a main conveyor belt for transporting containers in the thermal container treatment device, wherein the main conveyor belt may be designed to be drivable at a first speed in a first direction. Furthermore, the thermal container treatment device comprises the buffer conveyor for buffering containers in the thermal container treatment device. The buffer conveyor can be designed to be drivable at a second variably adjustable speed in the first direction, and the buffer conveyor can directly adjoin the main conveyor belt when viewed in the first direction. The buffer conveyor can be additionally designed to be drivable in a second direction, for example. The main conveyor belt can be driven at a constant speed during normal operation and during buffer operation of the thermal container treatment device. The speed and the direction in which the buffer belt is driven can be varied during normal operation and during buffer operation of the thermal container treatment device.

When controlled to a fill level of 30%, also referred to as the first fill level, an error in a further device upstream of the thermal container treatment device can be buffered by the buffer conveyor for at least 20, 30, 40, 50 or 60 seconds, and an error in a further device downstream of the thermal container treatment device can be buffered by the buffer conveyor for at least 20, 30, 40, 50, 60, 70, 80, 90, 100, 110 or 120 seconds.

The method may further comprise that, when controlled to a second fill level which is lower than the first fill level, an error in a further device upstream of the thermal container treatment device can be buffered by the buffer conveyor for less than 60 seconds, and an error in a further device downstream of the thermal container treatment device can be buffered by the buffer conveyor for more than 120 seconds.

By providing a lower fill level, for example, it is possible to take account of the fact that more errors have been found to occur downstream of the thermal container treatment device.

The method may further comprise that, when controlled to a third fill level which is higher than the first fill level, an error in a further device upstream of the thermal container treatment device can be buffered by the buffer conveyor for more than 60 seconds, and an error in a further device downstream of the thermal container treatment device can be buffered by the buffer conveyor for less than 120 seconds.

By providing a higher fill level, it is possible, for example, to take account of the fact that more errors have been found to occur upstream of the thermal container treatment device.

The terms "first", "second" and "third" fill level are only used to distinguish between the different fill levels mentioned.

Controlling can control the fill level of the buffer conveyor to 30%.

A buffer time for an error in a further device upstream of the thermal container treatment device can be at least 60 seconds.

It may be provided that a buffer time for an error in a further device downstream of the thermal container treatment device can be at least 120 seconds.

Alternatively, it may be provided that a first buffer time for a first error in a first further device upstream of the thermal container treatment device may be at least 60 seconds and that a second buffer time for a second error in a second further device downstream of the thermal container treatment device may be at least 60 seconds.

The error data comprise: information that an error has occurred in the at least one further device for treating the containers, said device being upstream or downstream of the thermal container treatment device, and/or information on downtimes, including, for example, frequency of errors, error duration and/or reduced output, and/or information on time dependencies of errors during production, and/or information on ambient pressure and/or ambient temperature and/or time of day during errors, and/or the number of errors upstream and/or downstream of the buffer conveyor and/or the number of errors upstream and/or downstream of the buffer conveyor that have caused the buffer conveyor to run completely empty or completely full, and/or accumulated duration of errors, and/or classified error data.

Treating the containers may comprise thermal treatment, controlling and/or packaging.

For example, a classification may take into account why an error occurred and whether it could occur again within a given time frame. If the error could occur again within the given time frame, this can be taken into account for controlling the buffer device within the given time frame. If the error could not occur again within the given time frame, the error does not need to be taken into account for controlling the buffer device.

For example, an error may occur in the dry section if foil is not added in time. The dry section then stops because there is no more foil. Once the foil supply has been replenished, the error has ended and will not occur again within a given time frame, for example one hour, as the foil supply has been replenished.

The control data can be obtained by means of automatic analysis, for example by means of an analysis program and/or machine learning.

A setpoint value for the fill level of the buffer conveyor can be increased or decreased on the basis of the error data and the increased or decreased setpoint value can be used to control the fill level.

The method can further comprise that capturing the error data relating to the at least one further device, analyzing the error data and obtaining control data and controlling the fill level of the buffer conveyor during normal operation of the filling line can be performed at regular intervals, for example every 10 seconds to 20 seconds, every 5 minutes to 45 minutes, once per hour, once per day or once per week, on the basis of the control data.

It can also be provided that only the error data of the at least one further device are captured at regular intervals, for example every 10 seconds to 20 seconds, every 5 minutes to 45 minutes, once per hour, once per day or once per week. Analyzing the error data, obtaining control data and controlling the fill level of the buffer conveyor during normal operation of the filling line on the basis of the control data are not carried out, for example, directly after the error data relating to the at least one further device are captured at regular intervals.

Alternatively, it may be provided that capturing the error data relating to the at least one further device and analyzing the error data and obtaining control data can be performed at regular intervals, for example every 10 seconds to 20 seconds, every 5 minutes to 45 minutes, once per hour, once per day or once per week. Controlling the fill level of the buffer conveyor during normal operation of the filling line is performed on the basis of the control data, for example, is not directly linked to the regular capturing of error data relating to the at least one further device, analysis of the error data and obtaining of control data.

Controlling the fill level of the buffer conveyor during normal operation of the filling line is performed on the basis of the control data after capturing the error data relating to the at least one further device and analyzing the error data and obtaining control data.

The method can further comprise the buffer being able to actively intervene in the output control of other machines. This is not just about dismantling/rebuilding the buffer, but also about "stretching" the buffer times so that the entire line does not come to a standstill. This means that the buffer can also build up the buffer with reduced output by analyzing the messages. This means that the buffer time can be increased without the entire line coming to a standstill. This will not affect the efficiency/OEE of the line.

The method may further comprise controlling the fill level of the buffer conveyor during normal operation of the filling line on the basis of the control data: after exceeding a first given maximum number of errors upstream and/or downstream of the buffer conveyor and/or after exceeding a second given maximum number of errors upstream and/or downstream of the buffer conveyor that have caused the buffer conveyor to run completely empty or completely full.

The method may further comprise controlling the fill level of the buffer conveyor during normal operation of the filling line on the basis of the control data after exceeding a given maximum number of accumulated error durations of errors upstream and/or downstream of the buffer conveyor.

The buffer device can comprise two, three or more buffer conveyors running parallel to one another and adjoining one another.

A filling line according to the invention comprises a thermal container treatment device comprising a buffer conveyor for buffering containers, the buffer conveyor being comprised in the filling line as a buffer device. The filling line also comprises at least one further device for treating the containers, which further device is arranged upstream or downstream of the thermal container treatment device. The buffer conveyor is controlled by means of the method described above or below.

BRIEF DESCRIPTION OF THE DRAWINGS

The accompanying figures show, by way of example, aspects and embodiments of the invention for better understanding and illustration. In the figures.

DETAILED DESCRIPTION

Figure 1:
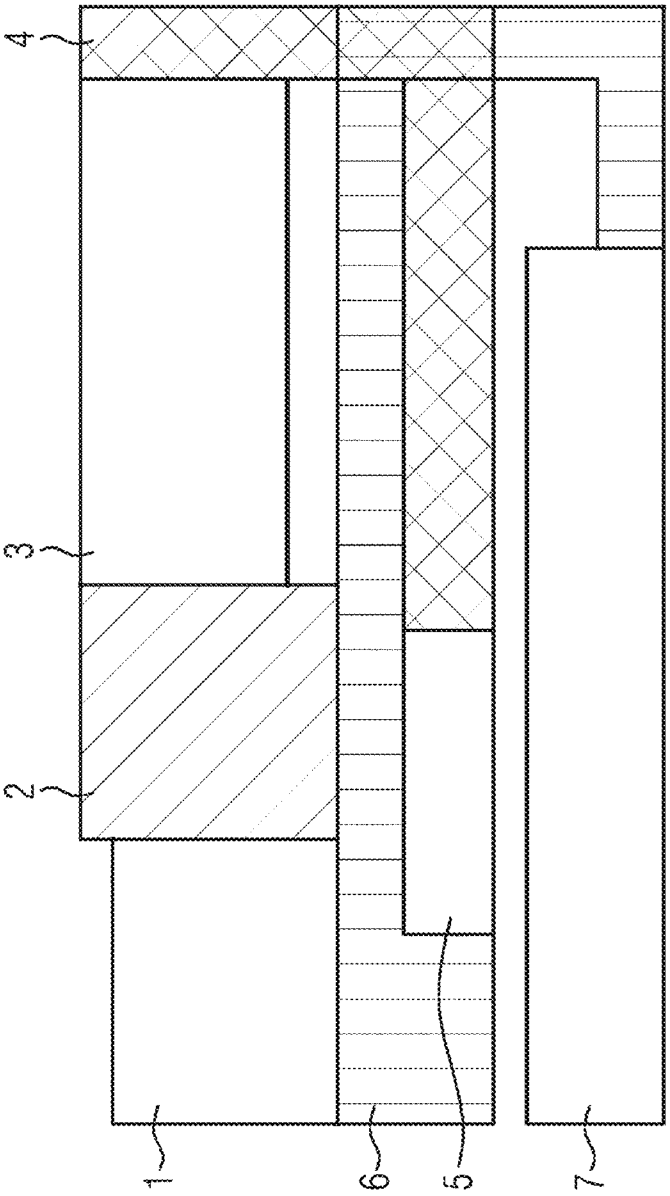
FIG. 1 (Prior art)
FIG. 1 is a schematic view of the space required for a filling line of the prior art.

FIG. 1 is a schematic view of the space required for a filling line of the prior art. A first buffer region 2 with a first buffer in mass transport, which is intended to buffer containers in the event of errors in the filler region 1, adjoins the filler region 1, which can also comprise an inspection, ejection and/or turning device in addition to the filler. A pasteurizer region 3 adjoins the first buffer region 2. If, for example, a double-deck pasteurizer is used, a division and/or merging into the two decks or downstream of the two decks can be provided. The division and/or the merging can be provided in mass transport. The division and/or the merging can also be used for buffering in a double-deck pasteurizer. A second buffer region 4 with a second buffer in mass transport is downstream of the pasteurizer region 3, which is intended to buffer containers in the event of errors in the pasteurizer region 3, whereby the buffer duration can be up to 60 seconds. The second buffer region 4 is followed by the single-lane inspection region 5. A third buffer region 6 with a third buffer is arranged downstream of the inspection region 5 in mass transport, which is intended to buffer containers in the event of errors in the inspection region 5, whereby the buffer duration can be up to 60 seconds. The dry section region 7 of the filling line is downstream of the third buffer region 6.

Implementing the buffers in mass transport requires a large amount of space. In addition, the individual buffers in the buffer regions are only used to buffer containers in the event of errors in the immediately preceding region.

Figure 2:
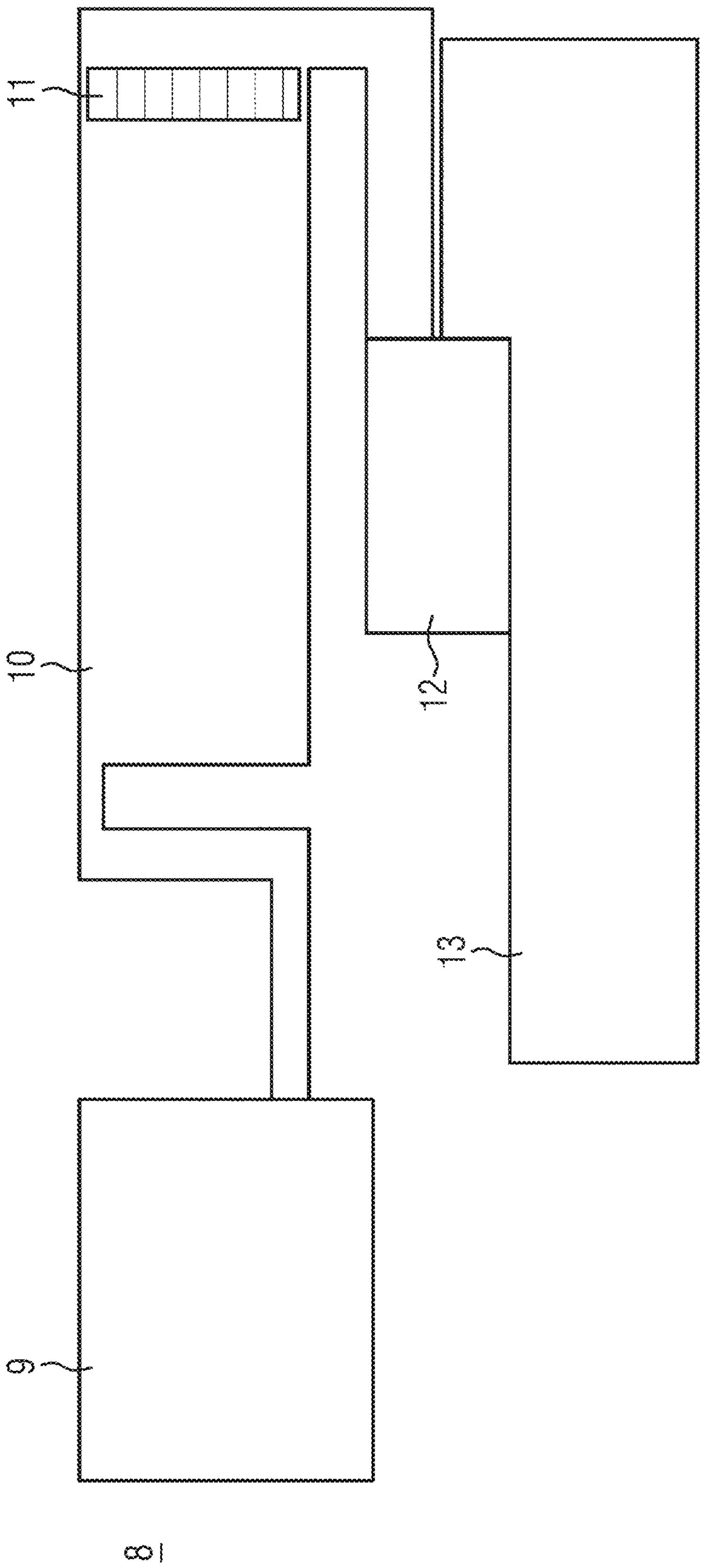
FIG. 2 is a schematic view of the space required for a filling line according to an embodiment.

FIG. 2 is a schematic view of the space required for a filling line 8 according to an embodiment. A region 10 of a thermal container treatment device adjoins the filler region 9, which, in addition to the filler, can also comprise an inspection, ejection and/or turning device, which can, for example, comprise a division and/or merging in the case of a double-deck version of the thermal container treatment device, wherein the region 10 comprises a buffer region 11 with a buffer conveyor. The division and/or merging can take place in single-lane transport. Buffering is therefore not provided for in the division and/or merging. An inspection region 12 is arranged downstream of the region 10 of the thermal container treatment device with the buffer region 11 and a dry section region 13 downstream of this. The buffer region 11 with the buffer conveyor is intended to buffer containers in the event of errors in the filler region 9 (i.e. errors upstream of the buffer region 11, i.e. upstream of the thermal container treatment device), to buffer containers in the event of errors in the inspection region 12 (i.e. errors downstream of the buffer area 11, i.e. downstream of the thermal container treatment device) and to buffer containers in the event of errors in the dry section region 13 (i.e. errors downstream of the buffer region 11, i.e. downstream of the thermal container treatment device). The buffer duration can be up to 60 seconds for errors upstream of the buffer region 11, i.e. upstream of the thermal container treatment device, and up to 120 seconds for errors downstream of the buffer region 11. By integrating the buffer region 11 with the buffer conveyor into the region 10 of the thermal treatment device and by using the buffer region 11 with the buffer conveyor for buffering containers in the event of errors upstream and/or downstream of the buffer region 11, i.e. the thermal container treatment device, the space requirement can be significantly reduced compared to that of the prior art.

Figure 3:
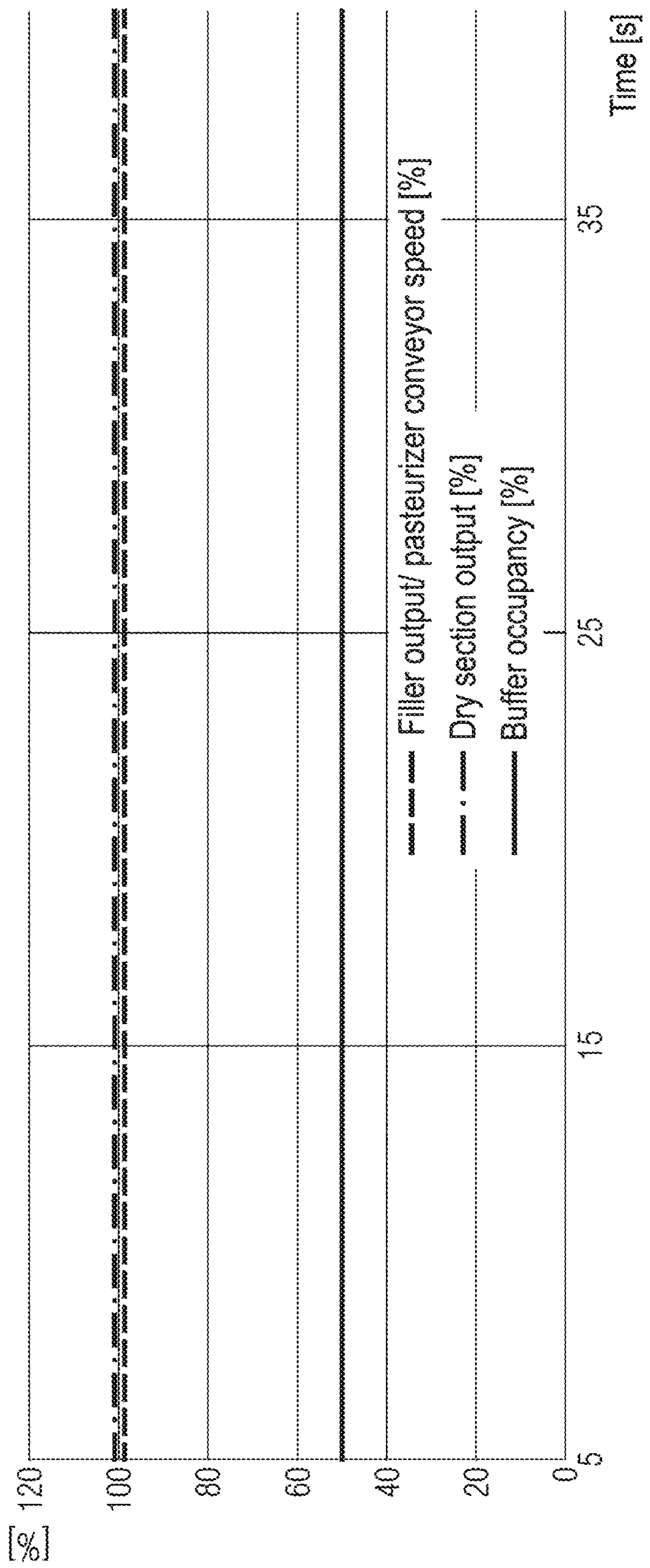
FIG. 3 is a diagram for normal operation without any errors.

FIG. 3 is a diagram for normal operation of the filling line 8 without any errors, the thermal treatment device being assumed to be a pasteurizer. Depending on the time in seconds, the occupancy of the buffer in % (solid line), the output of the filler or the conveyor speed of the pasteurizer in % (dashed line) and the output of the dry section in % (dotted line) are shown. The buffer occupancy is consistently at 50%. The output of the filler or the conveyor speed of the pasteurizer and the output of the dry section are each at 100% (they are shown slightly offset in the diagram).

The occupancy of the buffer, also known as the fill level of the buffer conveyor, determines the buffer times that are available for errors upstream and downstream of the buffer conveyor. The higher the fill level of the buffer conveyor in normal operation, the more time is available for buffering in the event of errors upstream of the thermal treatment device, but the less time is available in the event of errors downstream of the thermal treatment device. The lower the fill level of the buffer conveyor in normal operation, the more time is available for buffering in the event of errors downstream of the thermal treatment device, but the less time is available in the event of errors upstream of the thermal treatment device.

The ratio of buffer times for buffering upstream and downstream of the thermal treatment device can be adjusted by the fill level in normal operation. For example, the adjustment can be made during operation of the filling line, taking into account errors upstream and/or downstream of the thermal treatment device, their frequency, their duration, and/or their correlation with environmental conditions and/or production conditions.

Figure 4:
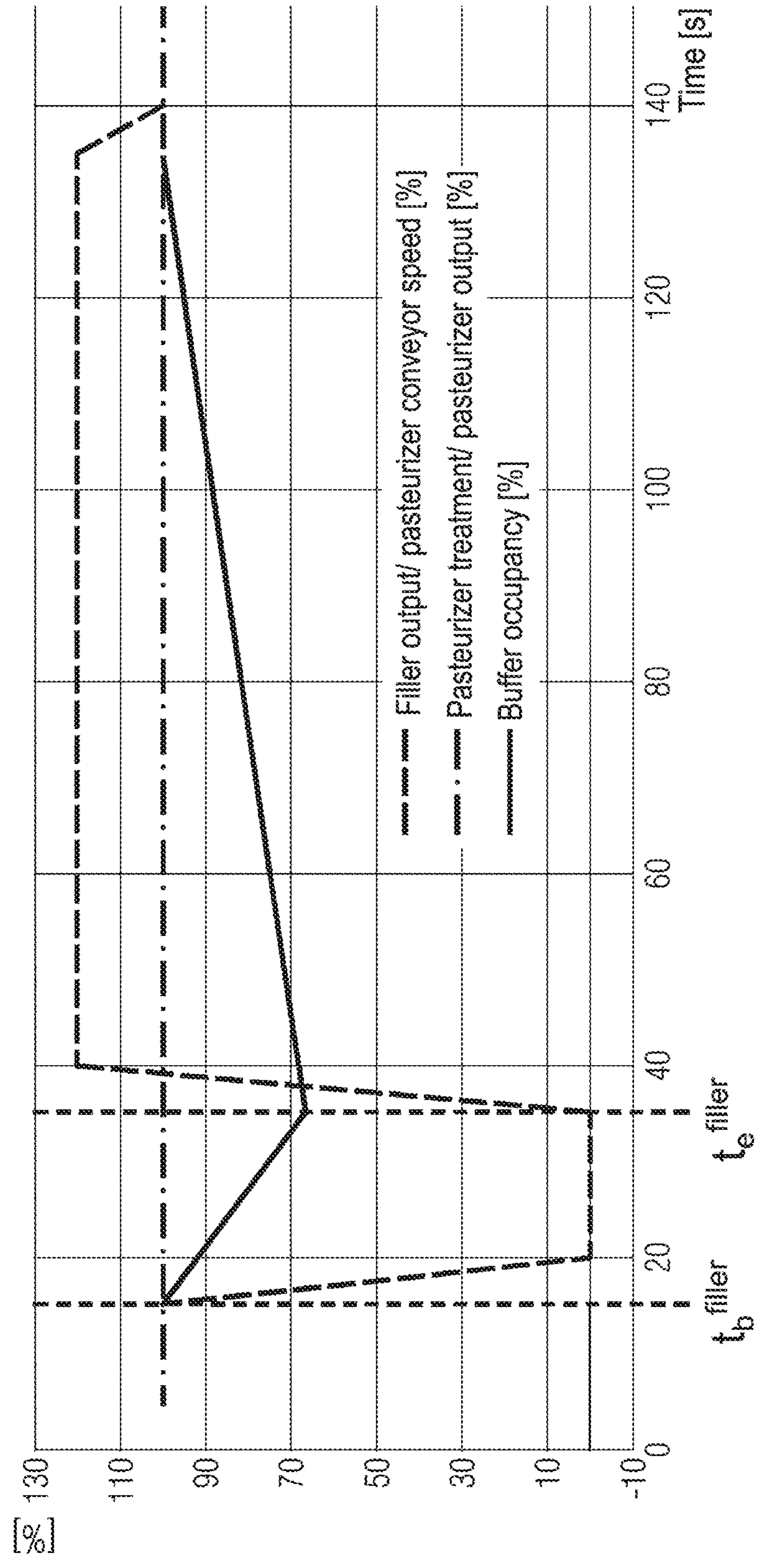
FIG. 4 is a diagram for operation in the event of an error upstream of the thermal treatment device.

FIG. 4 is a diagram for operation in the event of an error upstream of the thermal treatment device, the thermal treatment device being assumed to be a pasteurizer. Depending on the time in seconds, the occupancy of the buffer in % (solid line), the output of the filler or the conveyor speed of the pasteurizer in % (dashed line) and the treatment in the pasteurizer or the output of the pasteurizer in % (dotted line) are shown. An error in the filler begins at time to filler and the error in the filler ends at time $t_b^{filler}$. When the error begins, the main conveyor of the pasteurizer is stopped, but the existing containers in the pasteurizer continue to be treated. The buffer conveyor continues to transport the containers out of the pasteurizer at 100% of the nominal output, so that the occupancy of the buffer gradually decreases during the error. As soon as the error ends, the filler runs at 120% of the nominal output and the buffer conveyor transports the containers out of the pasteurizer at 120% of the nominal output. When the buffer conveyor returns to the fill level of the buffer conveyor in normal operation, the filler runs at 100% of the nominal output, the main conveyor of the pasteurizer then transports the containers at 100% of the nominal output and the buffer conveyor continues to transport the containers out of the pasteurizer at 100% of the nominal output. Instead of 120% of the nominal output (filler and/or main conveyor of the pasteurizer), 105% or 110% of the nominal output can also be provided.

Figure 5:
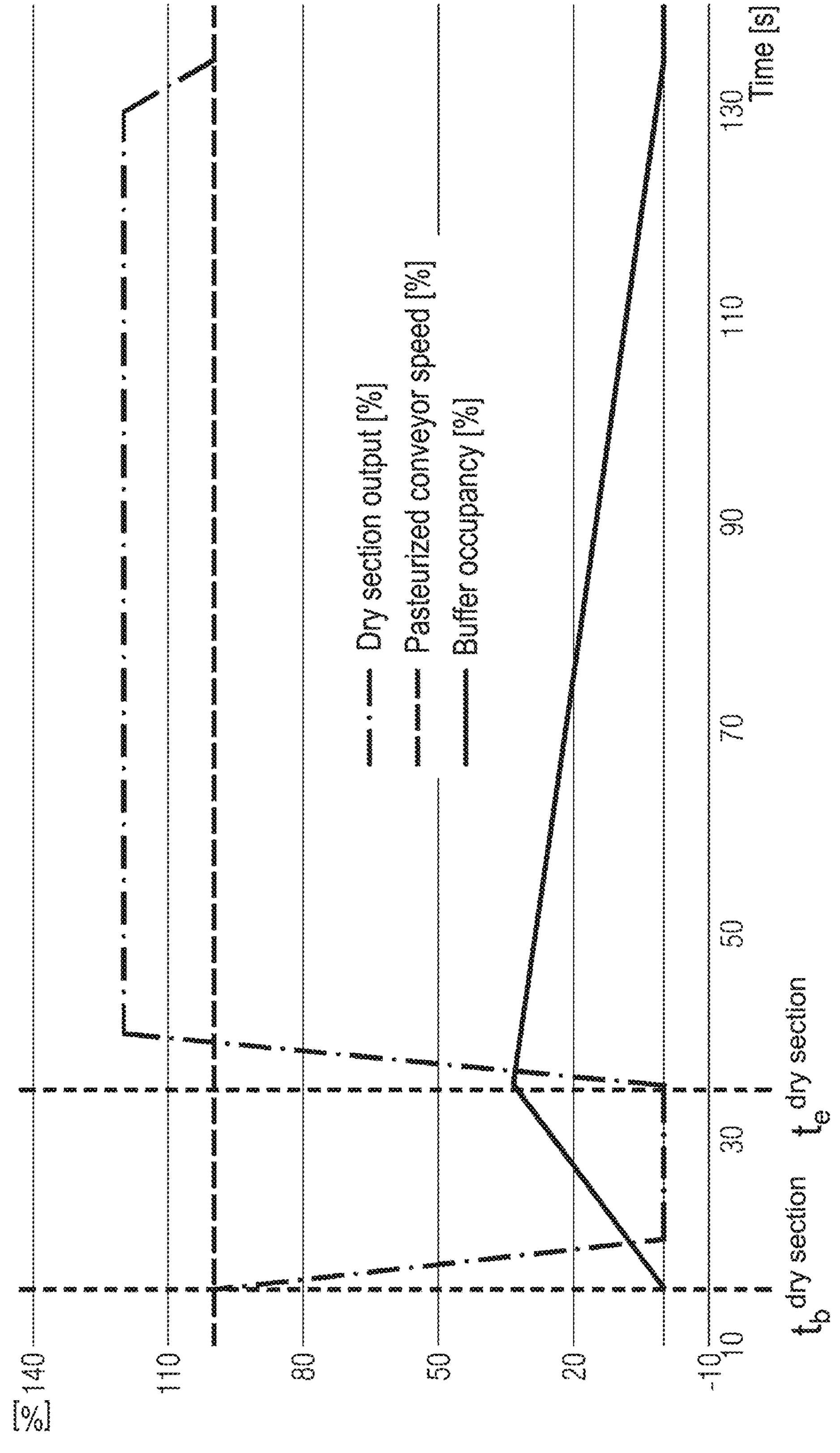
FIG. 5 is a diagram for operation in the event of an error downstream of the thermal treatment device.

FIG. 5 is a diagram for operation in the event of an error downstream of the thermal treatment device, the thermal treatment device being assumed to be a pasteurizer. Depending on the time in seconds, the occupancy of the buffer in % (solid line), the conveyor speed of the pasteurizer in % (dashed line) and the output of the dry section in % (dotted line) are shown. An error in the dry section begins at time $t_b^{dry\ section}$ and the error in the dry section ends at time $t_e^{dry\ section}$. When the error begins, no more containers are dispensed from the buffer conveyor to the downstream components and an outfeed downstream of the buffer conveyor stops. The buffer conveyor begins to buffer containers that are transferred to it, which increases the occupancy of the buffer. The buffer time here is 60 seconds, for example. After the end of the error in the dry section, the outfeed, the inspection device and the dry section start to operate at 120% of the nominal output. When the buffer conveyor has returned to the fill level of the buffer conveyor in normal operation, the outfeed, the inspection device and the dry section run again at 100% of the nominal output. The pasteurizer operates continuously at 100% of its nominal output.

Figure 6:
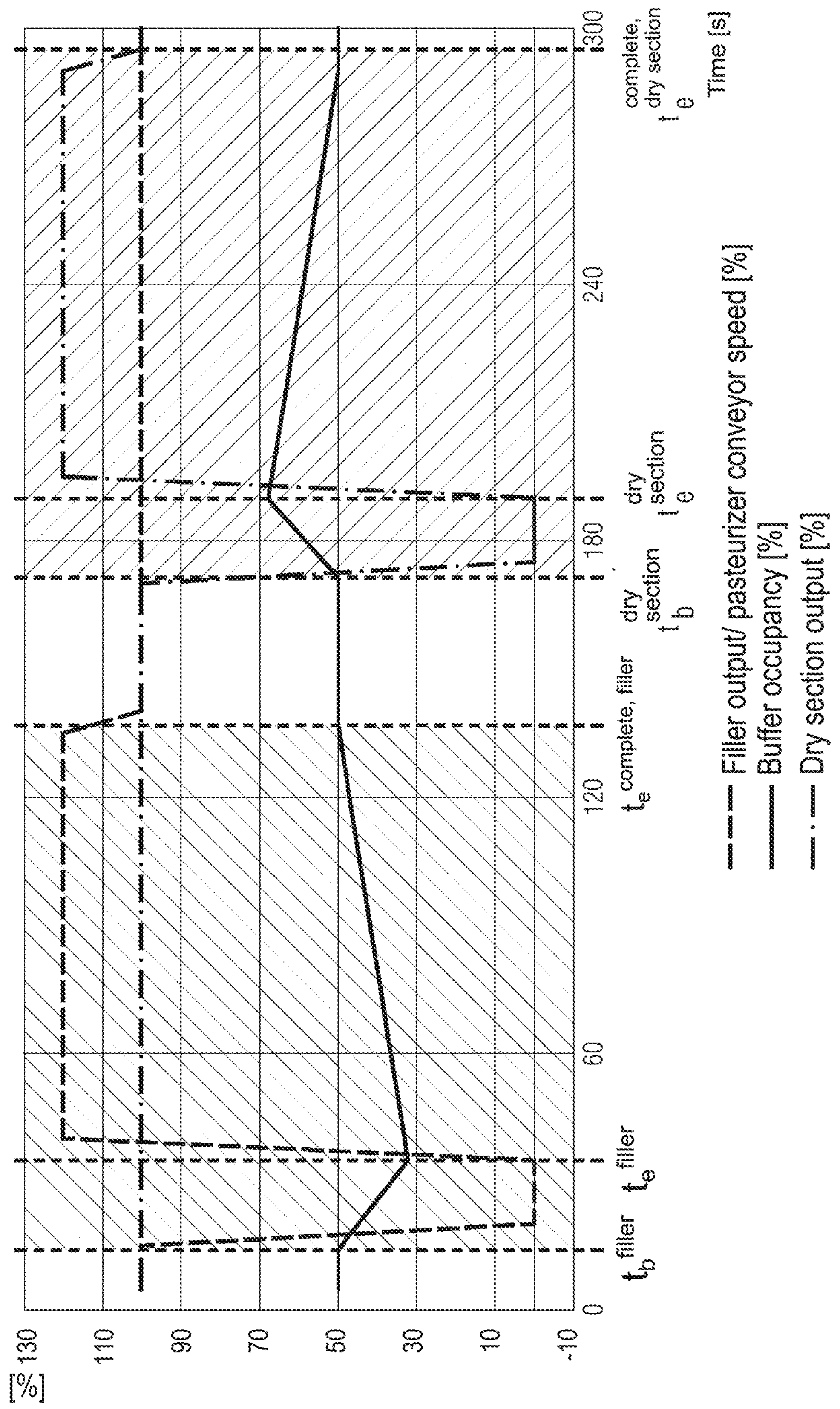
FIG. 6 is a diagram for operation with errors occurring at different times upstream and downstream of the thermal treatment device.

FIG. 6 is a diagram for operation with errors occurring at different times upstream and downstream of the thermal treatment device, the thermal treatment device being assumed to be a pasteurizer. Depending on the time in seconds, the occupancy of the buffer in % (solid line), the output of the filler or the conveyor speed of the pasteurizer in % (dashed line) and the output of the dry section in % (dotted line) are shown. An error in the filler begins at time $t_b^{filler}$, approximately 15 seconds, and the error ends at time $t_e^{filler}$, approximately 35 seconds. When this error begins, the main conveyor of the pasteurizer is stopped, but the existing containers in the pasteurizer continue to be treated. The buffer conveyor continues to transport the containers out of the pasteurizer at 100% of the nominal output, so that the occupancy of the buffer conveyor gradually decreases during the error. As soon as the error ends, the filler runs at 120% of the nominal output, the main conveyor of the pasteurizer transports the containers at 120% of the nominal output and the buffer conveyor transports the containers out of the pasteurizer at 100% of the nominal output. If the buffer conveyor is filled again to the fill level of the buffer conveyor in normal operation (here, for example, 50%) at time $t_e^{complete,\ filler}$, approximately 120 seconds, the filler runs at 100% of the nominal output, the main conveyor of the pasteurizer then transports the containers at 100% of the nominal output and the buffer conveyor transports the containers out of the pasteurizer at 100% of the nominal output.

An error in the dry section begins at time $t_b^{dry\ section}$, approximately 175 seconds, and the error in the dry section ends at time $t_e^{dry\ section}$, approximately 195 seconds. When the error begins, no more containers are dispensed from the buffer conveyor to the downstream components and an outfeed downstream of the buffer conveyor stops. The buffer conveyor begins to buffer containers that are transferred to it, which increases the occupancy of the buffer conveyor. The buffer time here is 60 seconds, for example. After the end of the error in the dry section, the outfeed, the inspection device and the dry section start to operate at 120% of the nominal output. When the buffer conveyor has been reduced to the fill level of the buffer conveyor in normal operation at time $t_e^{complete,\ dry}$ section, approximately 295 seconds, the outfeed, inspection device and dry section run again at 100% of the nominal output. The pasteurizer operates continuously at 100% of its nominal output.

The buffer time is 60 seconds for the error upstream of the thermal treatment device and 60 seconds for the error downstream of the thermal treatment device, resulting in a total buffer time of 120 seconds.

Figure 7:
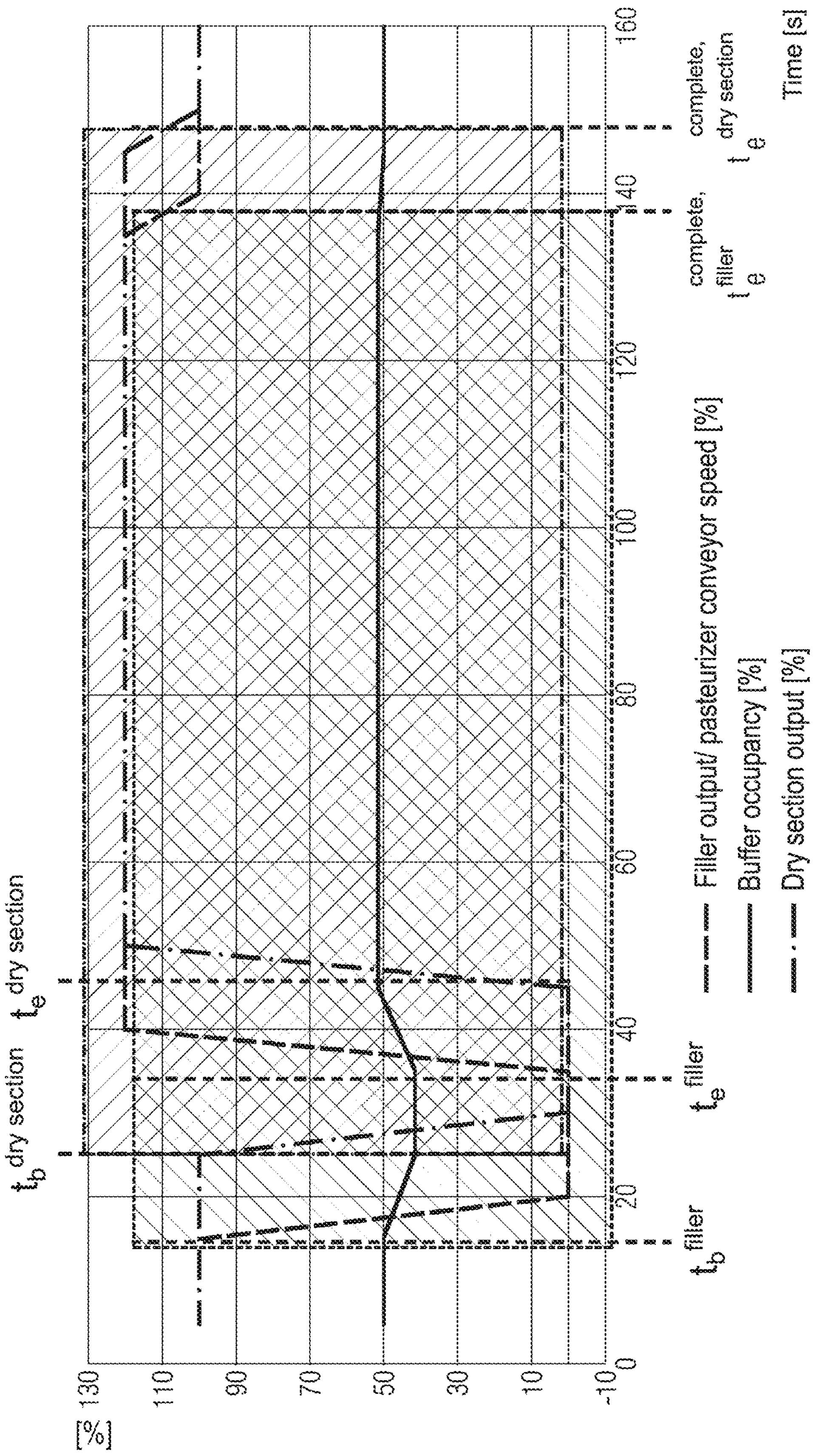
FIG. 7 is a diagram for operation with errors occurring at the same time upstream and downstream of the thermal treatment device.

FIG. 7 is a diagram for operation with errors occurring at the same time upstream and downstream of the thermal treatment device. At time $t_b^{filler}$, an error in the filler begins and when the error in the filler begins, the main conveyor of the pasteurizer is stopped, but the existing containers in the pasteurizer continue to be treated. The buffer conveyor continues to transport the containers out of the pasteurizer at 100% of the nominal output, so that the occupancy of the buffer conveyor gradually decreases during the error in the filler. An error in the dry section begins at time $t_b^{dry\ section}$. When the error in the dry section begins, no more containers are dispensed from the buffer conveyor to the downstream components and an outfeed downstream of the buffer conveyor stops. The buffer conveyor begins to buffer containers that are transferred to it. Since the error in the filler and in the dry section occur at the same time, the occupancy of the buffer conveyor remains constant during the time in which both errors are present.

The error in the filler ends at time $t_e^{filler}$. As soon as the error ends, the filler runs at 120% of the nominal output. The main conveyor belt of the pasteurizer transports the containers at 120% of the nominal output. The buffer conveyor gradually fills up as no containers are dispensed from the buffer conveyor due to the ongoing error in the dry section.

The error in the dry section ends at time $t_e^{dry\ section}$. After the end of the error in the dry section, the outfeed, the inspection device and the dry section start to operate at 120% of the nominal output. The fill level of the buffer conveyor is still a few %, for example 3%, above the fill level in normal operation. At time $t_e^{complete,\ filler}$, approximately 135 seconds, the filler is brought back to 100% of the nominal output. At time $t_e^{complete,\ filler}$, approximately 148 seconds, the outfeed, the inspection device and the dry section are brought back to 100% of the nominal output. The fill level of the buffer conveyor has been reduced to such an extent that it corresponds to the fill level in normal operation. The main conveyor of the pasteurizer operates continuously at 100% of the nominal output. The different times at which the output of the filler is brought back to 100% of the nominal output or the output of the dry section is brought back to 100% of the nominal output can result from the design and dimensioning of the buffer conveyor and the filling line.

Figure 8:
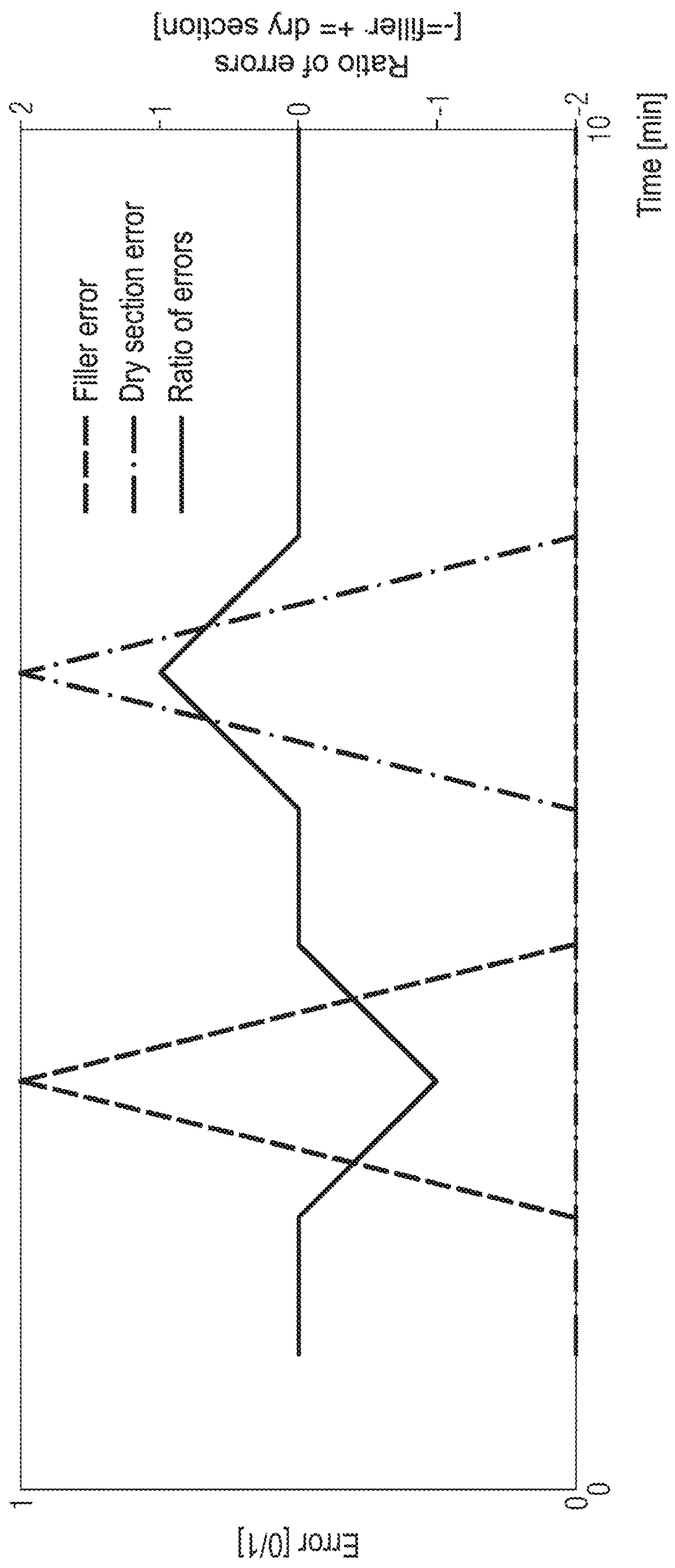
FIG. 8 is a diagram for a first ratio of errors over a period of time.

FIG. 8 is a diagram for a first ratio of errors over a period of time. The first ratio of errors is 1:1 for errors upstream of the thermal treatment device to errors downstream of the thermal treatment device. By way of example, there is an error in the filler (dashed line) and an error in the dry section (dotted line), each with the same duration. In the "ratio of errors" shown, negative values are assigned to the filler and positive values to the dry section.

Figure 9:
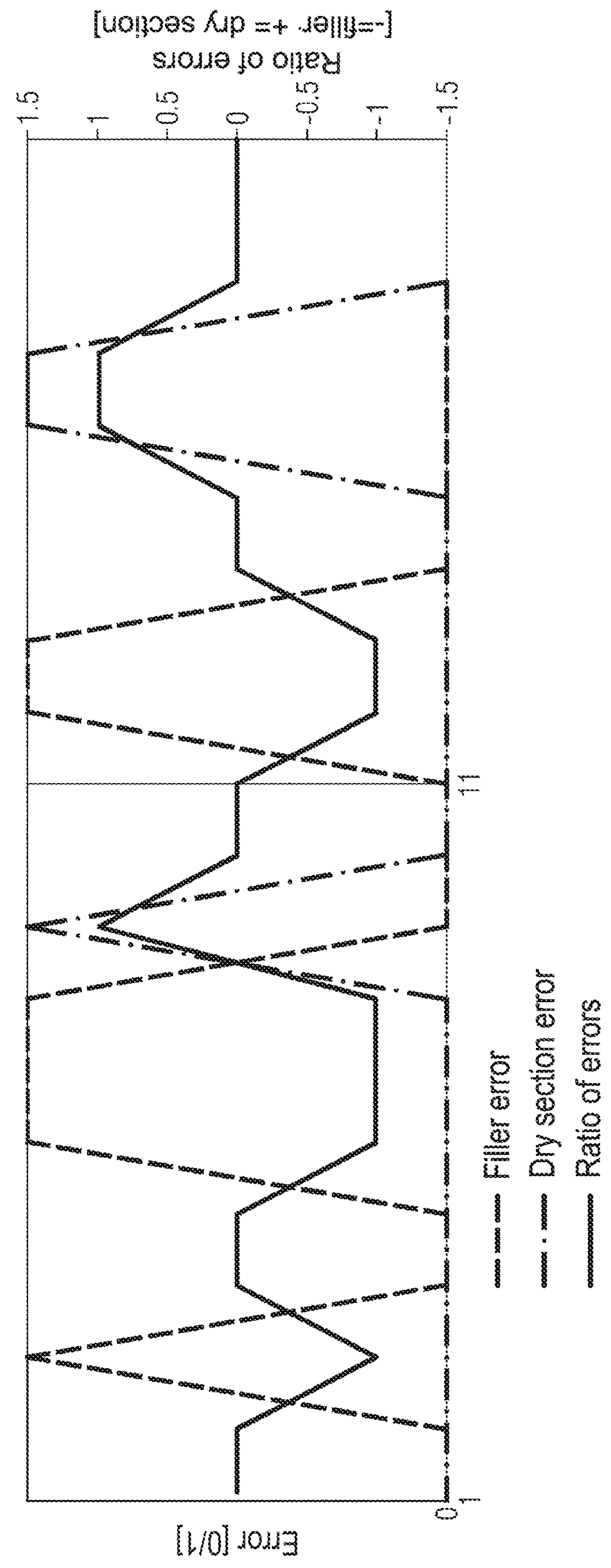
FIG. 9 is a diagram for a second ratio of errors over a period of time.

FIG. 9 is a diagram for a second ratio of errors over a period of time. The second ratio of errors is 2:1 for errors upstream of the thermal treatment device to errors downstream of the thermal treatment device. By way of example, there are three errors in the filler (dashed line) and two errors in the dry section (dotted line), with the durations resulting in a ratio of 67%: 33%. In the "ratio of errors" shown, negative values are assigned to the filler and positive values to the dry section. Since many errors occur upstream of the buffer, it may make sense to select the fill level of the buffer conveyor in normal operation such that a large part of the buffer time can be used for errors upstream of the thermal treatment device.

Figure 10:
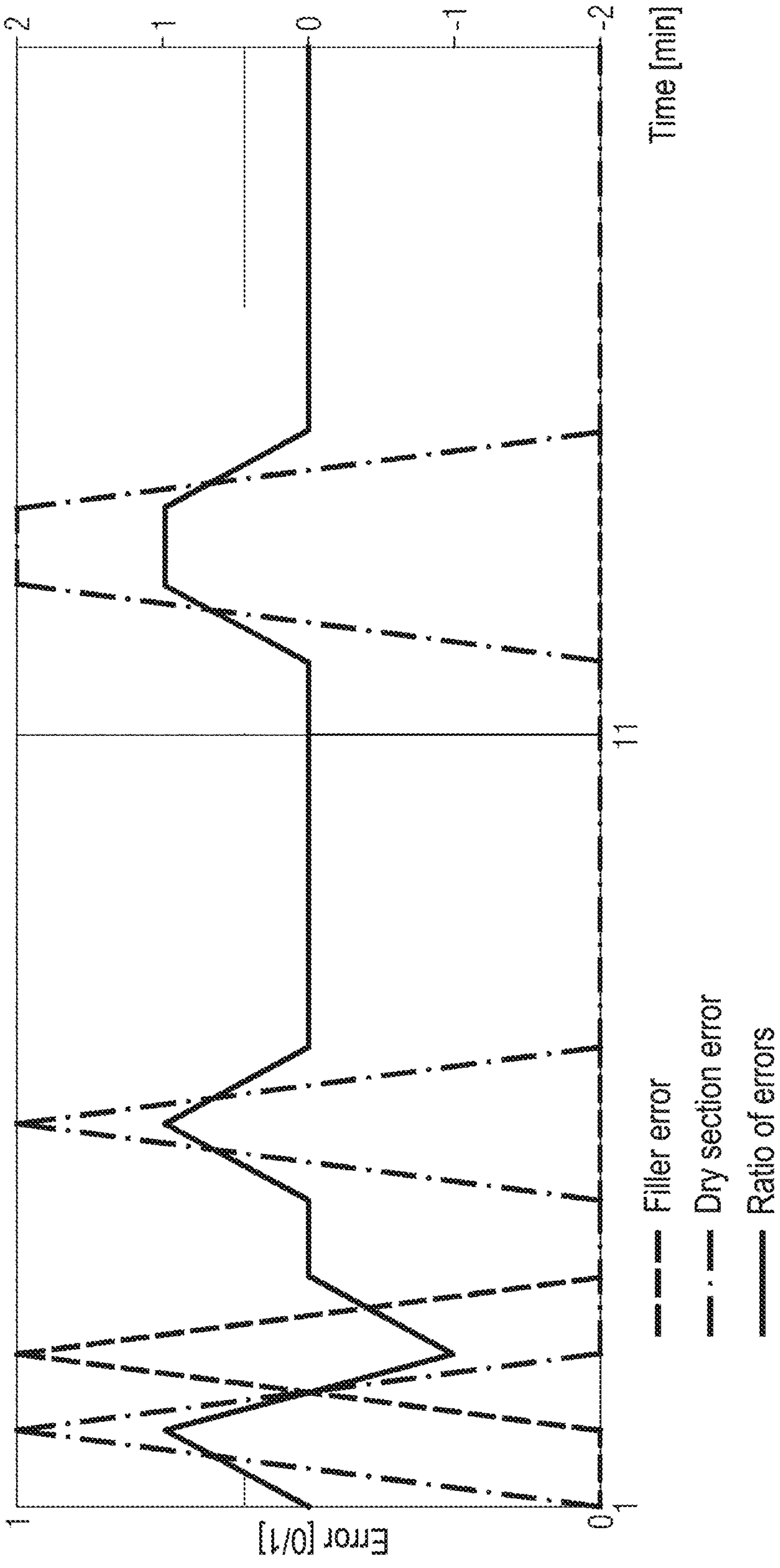
FIG. 10 is a diagram for a third ratio of errors over a period of time.

FIG. 10 is a diagram for a third ratio of errors over a period of time. The third ratio of errors is 1:4 for errors upstream of the thermal treatment device to errors downstream of the thermal treatment device. By way of example, there is one error in the filler (dashed line) and three errors in the dry section (dotted line), with the durations resulting in a ratio of 20%: 80%. In the "ratio of errors" shown, negative values are assigned to the filler and positive values to the dry section. Since many errors occur downstream of the thermal treatment device, it may make sense to select the fill level of the buffer conveyor in normal operation such that a large part of the buffer time can be used for errors downstream of the thermal treatment device.

Figure 11:
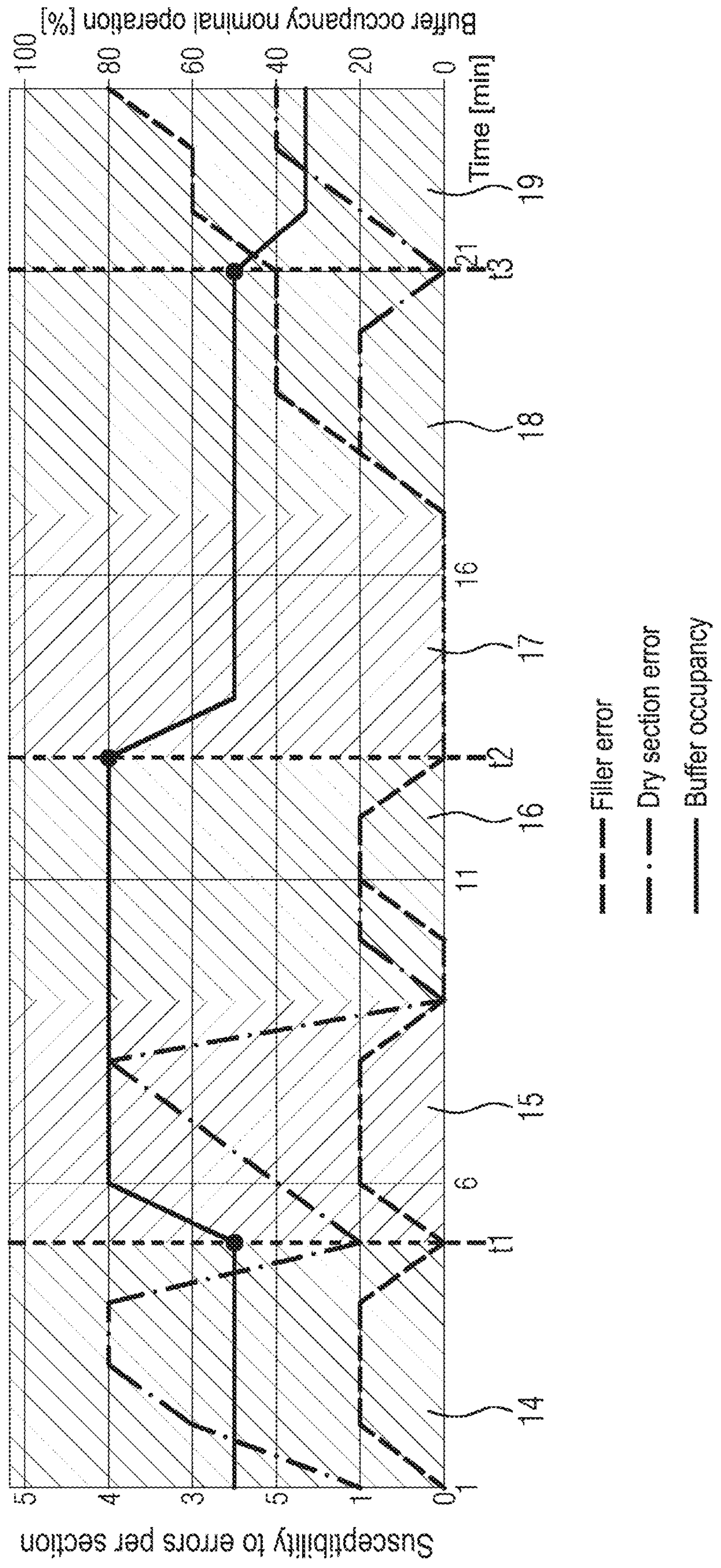
FIG. 11 is a diagram for an exemplary dynamic buffer control with adjustment of the buffer times.

FIG. 11 shows a diagram for an exemplary dynamic buffer control with adjustment of the buffer times. A susceptibility to errors, in this case in the filler and the dry section, is determined in various time periods 14-19. In the first period 14, the maximum susceptibility to errors of the filler, i.e. the number of errors occurring in the filler, is four and the maximum susceptibility to errors of the dry section, i.e. the number of errors occurring in the dry section, is one.

In the second period 15, the maximum susceptibility to errors of the filler, i.e. the number of errors occurring in the filler, is also four and the maximum susceptibility to errors of the dry section, i.e. the number of errors occurring in the dry section, is also one, although the duration of the errors in the filler is different to that of the first period 14.

In the third period 16, the maximum susceptibility to errors of the filler and the dry section is one each.

No errors occur in the fourth period 17.

In the fifth period 18, the maximum susceptibility to errors of the filler is one and the maximum susceptibility to errors of the dry section is two.

In the sixth period 19, the maximum susceptibility to errors of the filler, i.e. errors occurring in the filler, is two and the maximum susceptibility to errors of the dry section is four.

At times t1, t2 and t3, the buffer times are adjusted on the basis of the determined susceptibilities to errors by adjusting the fill level of the buffer during normal operation. Since the errors upstream of the thermal treatment device predominate in the first period 14, the fill level of the buffer is increased during normal operation. Since the errors upstream and downstream of the thermal treatment device are equally frequent in the third period 16, the fill level of the buffer is reduced during normal operation. Since the errors downstream of the thermal treatment device predominate in the fifth period 18, the fill level of the buffer is further reduced during normal operation.

The invention claimed is:

1. A method for controlling a buffer conveyor for buffering containers, wherein the buffer conveyor is comprised by a thermal container treatment device in a filling line as a buffer device, the filling line comprising at least one further device for treating the containers, the at least one further device being upstream or downstream of the thermal container treatment device, wherein the method comprises:

capturing error data relating to the at least one further device;

analyzing the error data and obtaining control data; and controlling a fill level of the buffer conveyor during normal operation of the filling line on a basis of the control data.

2. The method of claim 1, wherein the at least one further device includes a further device upstream of the thermal container treatment device and a further device downstream of the thermal container treatment device, and wherein, when controlled to a first fill level of 30%, an error in the further device upstream of the thermal container treatment device is buffered by the buffer conveyor for at least 20, 30, 40, 50 or 60 seconds, and an error in the further device downstream of the thermal container treatment device is buffered by the buffer conveyor for at least 20, 30, 40, 50, 60, 70, 80, 90, 100, 110 or 120 seconds.

3. The method of claim 2, wherein, when controlled to a second fill level which is lower than the first fill level, an error in the further device upstream of the thermal container treatment device is buffered by the buffer conveyor for less than 60 seconds, and an error in the further device downstream of the thermal container treatment device is buffered by the buffer conveyor for more than 120 seconds.

4. The method of claim 3, wherein, when controlled to a third fill level which is higher than the first fill level, an error in the further device upstream of the thermal container treatment device is buffered by the buffer conveyor for more than 60 seconds, and an error in the further device downstream of the thermal container treatment device is buffered by the buffer conveyor for less than 120 seconds.

5. The method of claim 1, wherein controlling the fill level of the buffer conveyor controls the fill level of the buffer conveyor to 30%.

6. The method of claim 5, wherein the at least one further device includes a further device upstream of the thermal container treatment device, and wherein a buffer time for an error in the further device upstream of the thermal container treatment device is at least 60 seconds.

7. The method of claim 6, wherein the at least one further device includes a further device downstream of the thermal container treatment device, and wherein a buffer time for an error in the further device downstream of the thermal container treatment device is at least 120 seconds.

8. The method of claim 6, wherein the at least one further device includes a further device downstream of the thermal container treatment device, and wherein a first buffer time for a first error in the further device upstream of the thermal container treatment device is at least 60 seconds, and wherein a second buffer time for a second error in the further device downstream of the thermal container treatment device is at least 60 seconds.

9. The method of claim 1, wherein the error data comprise:

information that an error has occurred in the at least one further device for treating the containers;

information on downtimes, including frequency of errors, error duration and/or reduced output;

information on time dependencies of errors during production;

information on ambient pressure, ambient temperature, and/or time of day during errors;

a number of errors upstream and/or downstream of the buffer conveyor;

a number of errors upstream and/or downstream of the buffer conveyor that have caused the buffer conveyor to run completely empty or completely full;

accumulated duration of errors; and/or classified error data.

10. The method of claim 1, wherein the control data are obtained by automatic analysis including by an analysis program and/or by machine learning.

11. The method of claim 1, wherein a setpoint value for the fill level of the buffer conveyor is increased or decreased on the basis of the error data and the increased or decreased setpoint value is used for controlling the fill level.

12. The method of claim 1, wherein capturing the error data relating to the at least one further device, analyzing the error data and obtaining the control data, and controlling the fill level of the buffer conveyor during normal operation of the filling line on the basis of the control data are performed at regular intervals, wherein the regular intervals include:

every 10 seconds to 20 seconds;

every 5 minutes to 45 minutes;

once per hour;

once per day; or once per week.

13. The method of claim 1, wherein controlling the fill level of the buffer conveyor during normal operation of the filling line on the basis of the control data is performed:

after exceeding a first given maximum number of errors upstream and/or downstream of the buffer conveyor; and/or after exceeding a second given maximum number of errors upstream and/or downstream of the buffer conveyor that have caused the buffer conveyor to run completely empty or completely full.

14. The method of claim 1, wherein controlling the fill level of the buffer conveyor during normal operation of the filling line on the basis of the control data is performed after exceeding a given maximum number of accumulated error durations of errors upstream and/or downstream of the buffer conveyor.

15. A filling line comprising:

a thermal container treatment device including a buffer conveyor for buffering containers, wherein the buffer conveyor is comprised in the filling line as a buffer device;

at least one further device for treating the containers, wherein the at least one further device is arranged upstream or downstream of the thermal container treatment device, and wherein the buffer conveyor is controlled by:

capture of error data relating to the at least one further device;

analysis of the error data and obtainment of control data; and control of a fill level of the buffer conveyor during normal operation of the filling line on a basis of the control data.

16. The filling line of claim 15, wherein the at least one further device includes a further device upstream of the thermal container treatment device and a further device downstream of the thermal container treatment device, and wherein, when controlled to a first fill level of 30%, an error in the further device upstream of the thermal container treatment device is buffered by the buffer conveyor for at least 20, 30, 40, 50 or 60 seconds, and an error in the further device downstream of the thermal container treatment device is buffered by the buffer conveyor for at least 20, 30, 40, 50, 60, 70, 80, 90, 100, 110 or 120 seconds.

17. The filling line of claim 16, wherein, when controlled to a second fill level which is lower than the first fill level, an error in the further device upstream of the thermal container treatment device is buffered by the buffer conveyor for less than 60 seconds, and an error in the further device downstream of the thermal container treatment device is buffered by the buffer conveyor for more than 120 seconds.

18. The filling line of claim 17, wherein, when controlled to a third fill level which is higher than the first fill level, an error in the further device upstream of the thermal container treatment device is buffered by the buffer conveyor for more than 60 seconds, and an error in the further device downstream of the thermal container treatment device is buffered by the buffer conveyor for less than 120 seconds.

19. The filling line of claim 15, wherein the error data comprise:

information that an error has occurred in the at least one further device for treating the containers;

information on downtimes, including frequency of errors, error duration and/or reduced output;

information on time dependencies of errors during production;

information on ambient pressure, ambient temperature, and/or time of day during errors;

a number of errors upstream and/or downstream of the buffer conveyor;

a number of errors upstream and/or downstream of the buffer conveyor that have caused the buffer conveyor to run completely empty or completely full;

accumulated duration of errors; and/or classified error data.

20. The filling line of claim 15, wherein control of the fill level of the buffer conveyor during normal operation of the filling line on the basis of the control data is performed:

after exceeding a first given maximum number of errors upstream and/or downstream of the buffer conveyor; and/or after exceeding a second given maximum number of errors upstream and/or downstream of the buffer conveyor that have caused the buffer conveyor to run completely empty or completely full.

* * * * *